United States Patent [19]

Shapiro et al.

[11] Patent Number: 4,686,697
[45] Date of Patent: Aug. 11, 1987

[54] TELEPHONE CARE SYSTEM WITH TELEPHONE LINE-CHECKING

[75] Inventors: L. Dennis Shapiro, Chestnut Hill; Richard G. Aseltine, Jr., Framingham, both of Mass.

[73] Assignee: Lifeline Systems, Inc., Waltham, Mass.

[21] Appl. No.: 553,748

[22] Filed: Nov. 21, 1983

[51] Int. Cl.⁴ .............................. H04M 11/04
[52] U.S. Cl. .................... 379/38; 379/27; 379/40
[58] Field of Search ............ 179/5 R, 5 P, 81 C, 179/84 L, 175.3 F; 379/5, 27, 28, 37, 38, 40, 51, 396

[56] References Cited

U.S. PATENT DOCUMENTS

| | | | |
|---|---|---|---|
| 3,700,813 | 10/1972 | Colman | 179/5 P |
| 3,899,645 | 8/1975 | Brafman | 179/5 R X |
| 3,987,246 | 10/1976 | Willis | 179/5 R X |
| 4,051,327 | 9/1977 | Rigsby | 179/5 R |
| 4,273,961 | 1/1981 | Blank et al. | 179/5 R |
| 4,284,849 | 8/1981 | Anderson et al. | 179/5 R |
| 4,303,801 | 12/1981 | Anderson et al. | 179/5 R |
| 4,390,750 | 1/1983 | Bartelink | 179/5 R |
| 4,510,350 | 4/1985 | Wagner et al. | 179/5 P |

FOREIGN PATENT DOCUMENTS

81/02657  9/1981  PCT Int'l Appl. .............. 179/5 R

Primary Examiner—Keith E. George
Attorney, Agent, or Firm—Bromberg, Sunstein & Casselman

[57] ABSTRACT

A telephone care system has a line-checking arrangement connected to the line-seizing arrangement and an off-hook detector so as to activate the line-seizing arrangement and send a bad-line signal in the event that the off-hook detector does not provide an off-hook signal when the line has been seized. A preferred embodiment also uses a pilot light as a combined power-on and telephone line status indicator by causing the pilot light to blink in the presence of a bad-line signal. A preferred embodiment also utilizes the off-hook detector for the additional purpose of resetting an inactivity timer, which, on expiration of a predetermined interval of time, triggers an alarm call over the telephone wires.

4 Claims, 1 Drawing Figure

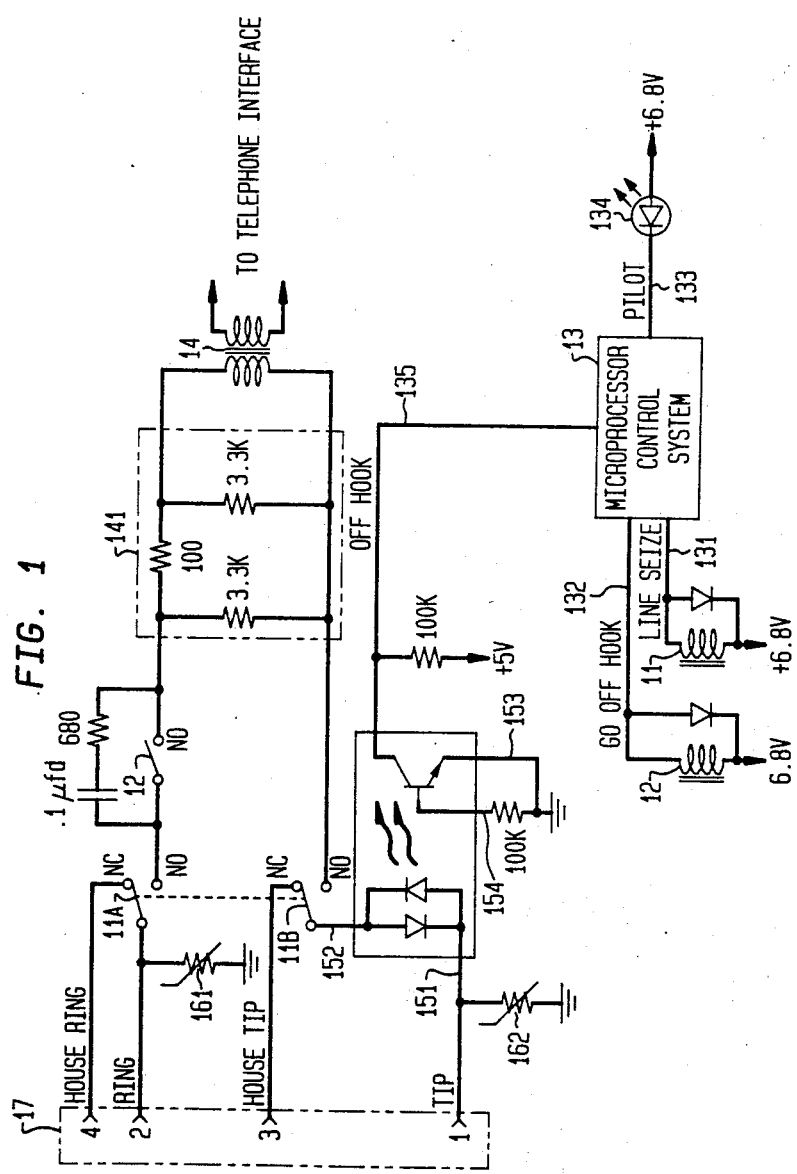

TELEPHONE CARE SYSTEM WITH TELEPHONE LINE-CHECKING

DESCRIPTION

TECHNICAL FIELD

The present invention relates to devices for the communication by telephone wires of information concerning the attentiveness, physical condition, need, or other circumstances of persons whose physical condition or situation may require such communication.

BACKGROUND OF THE INVENTION

Devices of the type utilizing a plurality of communicator devices in various location to communicate by telephone with a single emergency response center are disclosed in U.S. Pat. Nos. 3,989,900 and 4,064,368, issued for inventions of Dibner, and assigned to Lifeline Sytems, Inc. A communicator device of the general type to which the present invention pertains is the Lifeline model H101A communicator, which is described in the service manual that is attached to the application file and incorporated herein by reference as Exhibit 1. U.S. Pat. No. 3,662,111, issued for an invention of Rubinstein, discloses a telephone care device for cyclically generating an alarm signal at predetermined time intervals that will dial a predetermined telephone number to transmit a pre-recorded message in the event that a switch is no actuated within the predetermined time interval. Systems of the foregoing type, however, do not have provision for checking of the condition of the telephone lines nor for indicating the results of such checking.

DISCLOSURE OF INVENTION

An embodiment of the present invention provides a telephone-line testing device having a line-seizing arrangement for connectng an off-hook load to the telephone wires and an off-hook detector connected to the telephone wires for sending an off-hook signal when a telephone circuit is in an off-hook condition. In a preferred embodiment, the invention provides a telephone care system having a line-checking arrangement connected to the line-seizing arrangement and the off-hook detector so as to activate the line-seizing arrangement and send a bad-line signal in the event that the off-hook detector fails to provide an off-hook signal when the line has been seized. A preferred embodiment also uses a pilot light as a combined power-on and telephone line status indicator by causing the pilot light to blink in the presence of a bad-line signal. A preferred embodiment also utilizes the off-hook detector for the additional purpose of resetting an inactivity timer, which, on expiration of a predetermined interval of time, triggers an alarm call over the telephone wires.

BRIEF DESCRIPTION OF THE DRAWINGS

The invention will be more readily understood by consideration of the following detailed description taken with the accompanying drawings, in which FIG. 1 presents a schematic of a preferred embodiment of the invention.

DESCRIPTION OF SPECIFIC EMBODIMENTS

Referring to FIG. 1, a preferred embodiment of the present invention includes a series of inputs 17 for connection to telephone wires (terminal 1 and 2) and a home telephone (terminals 3 and 4). Surge protection on the telephone wires is provided by varistors 161 and 162 with a threshold of about 350 volts. A line-seizing relay has a double pole double throw switch for seizing the telephone line from the house phone; the two poles 11A and 11B of this relay's switch are operated by coil 11, which is energized by the microprocesor control system 13 over line 131 to disconnect the normally closed house phone circuit and connect the normally open communicator circuit. In series with the arm of switch 11B is the input of opto-isolater 15. The opto-isolater is type H11AA1 or equivalent, which is wired in its output circuit to provide a signal on line 135 when the telephone lines go into an off-hook condition, either by operation of the telephone or by activation of the communicator when there has been a line seizure by relay 11. The switch of dialing relay 12 is normally open, but when the coil of relay 12 is energized over line 132 by the microprocessor control system 13, the switch closes and causes the device to go off-hook. The off-hook load is provided by pi-divider network 141 and telephone interface transformer 14.

As in prior devices of this type, when the subscriber picks up the telephone, the off-hook signal on 135 is used by microprocessor control system 13 to reset an inactivity timer which, if not reset within a predetermined period of time, will cause the microprocessor control system 13 to activate the coil of relay 11, thereby seizing the line, and then to use the coil of dialer relay 12 to dial a predetermined telephone number and therefore to send an appropriate message via the telephone interface over the telephone wires.

The present invention, however, uses the same signal over line 135, indicative of an off-hook condition, to test the condition of the telephone lines in the following manner. On a periodic basis, microprocessor control system 13 energizes the coil relay 11 to cause the line to be seized. It then activates the coil of relay 12, causing the system to go off-hook under normal circumstances; if an off-hook signal is received by the microprocessor control system 13 over line 135, the telephone line is assumed to be in good status, and thereafter the relays 11 and 12 are de-energized without further action by the control system 13. If, however, an off-hook signal is not present on line 135, the microprocessor control system also generates a bad-line signal that is used to cause LED pilot light 134, which is powered over line 133, to blink. In a normal power-on condition with no indication of a bad telephone line, the LED 134 would glow steadily. Provided the system has a battery back-up, in a manner known in the art, LED 134 can be made to blink even in the absence of ac power to the device. An audible bad-line indication can also be provided in a manner well-known in the art. In some embodiments, it may be found desirable, once a bad-line condition has been detected, for the system to increase the frequency of the telephone line checking until line status is again indicated as being good, whereupon the frequency of the telephone line-checking reverts to the normal slower rate; this feature permits the system to advise the subscriber at an earlier time when the line has returned to good status. Furthermore, the system may include an arrangement for delaying the attempt (by seizing the line and dialing, etc.) at sending of message over the telephone wires until the line status is indicated, in the above manner, as good. Where this arrangement is included, the higher frequency of the line testing, once a bad-line condition has been found, can be important.

Furthermore, line checking in the foregoing manner will, in this embodiment, also be initiated ech time that the inactivity timer is manually reset. A separate timing system governs operation of the line-checking; this system is also reset when the inactivity timer is manually reset.

Accordingly, while the invention has been described with particular reference to specific embodiments, it will be understood that it may be embodied in a variety of forms diverse from those shown and descried without departing from the spirit and scope as defined by the following claims.

What is claimed is:

1. A system for communication by telephone wires of information concerning the circumstances of a subscriber, the system comprising:
    (a) timing means for timing a predetermined interval of time from a beginning point established by a timer reset signal input and providing an expiration signal output upon the expiration of the predetermined interval of time;
    (b) line-seizing means for connecting a communication output to the telephone wires;
    (c) off-hook detector means connected to the telephone wires for sending an off-hook signal when a telephone circuit is in an off-hook condition;
    (d) dialing means for dialing a telephone number over the communicator output;
    (e) control means, connected to the timing means, line-seizing means, the off-hook detector means, and the dialing means, for (i) providing a timer reset signal to the timing means on receippt of an off-hook signal from the off-hook detector means when the line-seizing means has not been activated, and (ii) on activation by an expiration signal from the timing means or other specified occurrence, entering an alarm state, activating the line-seizing means and the dialing means, and sending a predetermined message over the communicator output;
    (f) line-checking means, connected to the line-seizing means and the off-hook detector means, (i) for periodically activating the line-seizing means, (ii) for sending a bad-line signal in the event that the off-hook detector means does not provide an off-hook signal when the line-seizing means has been activated, and (iii) for increasing the frequency of activation of the line-seizing means when the control means is not in an alarm state, in the event that an off-hook signal is not provided by the off-hook detector means on activation of the line-seizing means.

2. A system according to claim 1, wherein the line-checking means includes cycle means connected to the control means for activating the line-seizing means on receipt of the timer reset signal and on the expiration of a designated time period after receipt of the timer reset signal.

3. A telephone line testing device for a telephone communication system having an alarm state comprising:
    (a) line-seizing means for connecting an off-hook load to the telephone line;
    (b) off-hook detector means connected to the telephone line for sending an off-hook signal when a telephone circuit is in an off-hook condition; and
    (c) line-checking means connected to the line-seizing means and the off-hook detector means (i) for periodically activating the line-seizing means, and (ii) for sending a bad-line signal in the event that the off-hook detector means does not provide an off-hook signal when the line-seizing means has been activated and increasing the frequency of activating of the line-seizing means when the system is not in an alarm state.

4. A telephone line testing device, for a telephone communication system having an alarm state, the device comprising:
    (a) line-seizing means for connecting an off-hook load to the telephone line;
    (b) off-hook detector means connected to the telephone line for sending an off-hook signal when a telephone circuit is in an off-hook condition; and
    (c) line-checking means connected to the line-seizing means and the off-hook detector means (i) for periodically activating the line-seizing means, and (ii) for sending a bad-line signal in the event that the off-hook detector means does not provide an off-hook signal when the line-seizing means has been activated and increasing the frequency of activation of the line-seizing means until such time as said bad-line signal is no longer obtained pursuant to such activation.

* * * * *